(12) United States Patent
Li et al.

(10) Patent No.: US 12,579,827 B2
(45) Date of Patent: Mar. 17, 2026

(54) INFERRING ELECTRIC GRID ASSET CHARACTERISTICS USING PHOTOGRAMMETRY

(71) Applicant: X Development LLC, Mountain View, CA (US)

(72) Inventors: Xinyue Li, San Mateo, CA (US); Kshitij Naresh Nikhal, Lincoln, NE (US); Kari Anne Klein, Boulder, CO (US); Ananya Gupta, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 517 days.

(21) Appl. No.: 18/160,841

(22) Filed: Jan. 27, 2023

(65) Prior Publication Data

US 2024/0257541 A1     Aug. 1, 2024

(51) Int. Cl.
| | |
|---|---|
| *G06V 10/80* | (2022.01) |
| *G06V 10/75* | (2022.01) |
| *G06V 10/82* | (2022.01) |
| *G06V 20/00* | (2022.01) |
| *G06V 20/64* | (2022.01) |

(52) U.S. Cl.
CPC .......... *G06V 20/647* (2022.01); *G06V 10/757* (2022.01); *G06V 10/809* (2022.01); *G06V 10/82* (2022.01); *G06V 20/38* (2022.01)

(58) Field of Classification Search
None
See application file for complete search history.

(56) References Cited

U.S. PATENT DOCUMENTS

| | | | |
|---|---|---|---|
| 8,577,707 | B2 | 11/2013 | Nielsen et al. |
| 9,438,312 | B2 | 9/2016 | Bernheim et al. |
| 9,903,894 | B2 | 2/2018 | Abi-Ackel et al. |
| 10,097,240 | B2 | 10/2018 | Hansell et al. |
| 10,163,242 | B2 | 12/2018 | Jagerson |
| 10,444,806 | B2 | 10/2019 | Brockman et al. |
| 2017/0092055 | A1 | 3/2017 | Brockman et al. |
| 2020/0025877 | A1 | 1/2020 | Sarkis et al. |
| 2020/0034638 | A1 | 1/2020 | Brewington et al. |
| 2020/0097618 | A1 | 3/2020 | Agouridis |
| 2020/0191969 | A1 | 6/2020 | Schultz et al. |
| 2021/0073692 | A1* | 3/2021 | Saha .................... G06Q 50/163 |
| 2021/0407187 | A1* | 12/2021 | Gupta .................... G01S 17/89 |

* cited by examiner

*Primary Examiner* — Idowu O Osifade
(74) *Attorney, Agent, or Firm* — Fish & Richardson P.C.

(57) ABSTRACT

Methods, systems, and apparatus, including computer programs encoded on a storage device, for identifying characteristics of electric grid assets are disclosed. A method includes obtaining a plurality of images, each image depicting at least one utility pole of an electric grid; detecting, in each of the plurality of images, keypoints of the at least one utility pole depicted in the image; determining, using the keypoints from at least two images of a particular utility pole, at least one measurement of the particular utility pole; determining, using the measurement of the particular utility pole, an electrical characteristic of an asset supported by the particular utility pole; and providing the electrical characteristic as an output. The two or more images include images of the particular utility pole captured from multiple different camera perspectives. The asset can include a capacitor, a transformer, a switch, a power line.

20 Claims, 5 Drawing Sheets

500

OBTAINING IMAGES DEPICTING AT LEAST ONE UTILITY POLE 502

DETECTING KEYPOINTS OF THE AT LEAST ONE UTILITY POLE 504

DETERMINING A MEASUREMENT OF A PARTICULAR UTILITY POLE USING THE KEYPOINTS 506

DETERMINING AN ELECTRICAL CHARACTERISTIC OF AN ASSET SUPPORTED BY THE PARTICULAR UTILITY POLE 508

PROVIDING THE ELECTRICAL CHARACTERISTIC AS OUTPUT 510

500

OBTAINING IMAGES DEPICTING AT LEAST ONE UTILITY POLE          _502_

DETECTING KEYPOINTS OF THE AT LEAST ONE UTILITY POLE          _504_

DETERMINING A MEASUREMENT OF A PARTICULAR UTILITY POLE
USING THE KEYPOINTS          _506_

DETERMINING AN ELECTRICAL CHARACTERISTIC OF AN ASSET
SUPPORTED BY THE PARTICULAR UTILITY POLE          _508_

PROVIDING THE ELECTRICAL CHARACTERISTIC AS OUTPUT          _510_

INFERRING ELECTRIC GRID ASSET CHARACTERISTICS USING PHOTOGRAMMETRY

TECHNICAL FIELD

The present specification relates to electric power grids, and specifically to determining electrical characteristics of electric grid components using computer vision.

BACKGROUND

Electrical power grids transmit electrical power to loads such as residential, commercial, and industrial electricity customers. Electric grids are changing rapidly as power grids are expanded, distributed power sources are added to the grid, and aging sections of power grids are updated or replaced. Due to the growing size, complexity, and variability of electrical power grids, there is a need to accurately and efficiently identify electric power assets distributed throughout the grid as the structure of the grid changes over time.

SUMMARY

In general, the present disclosure relates to modeling electric grid assets using photogrammetry. The present disclosure provides systems and methods to determine locations and electrical characteristics of various assets within an electric power grid. An electric grid asset characterization system can employ images of utility poles captured from various perspectives to detect the location of utility poles and of electric grid assets that are attached to or located on or near utility poles. From the images, the system can determine measurements of the utility poles and the attached assets, and determine electric characterizations of the assets.

Images can be used to identify electrical properties of utility poles and electric grid assets supported by the poles. The images can include oblique aerial images that provide an angled view of the world. By using photogrammetry, measurements of utility poles can be determined from the multiple views depicted in the oblique aerial images. Electrical properties can then be inferred from the measurements of the utility poles. For example, a voltage level of power lines can be inferred from a height of a utility pole, a line spacing, which can be used for calculating line impedance, can be inferred from a utility pole crossarm width, or a voltage of a transformer can be inferred from a height at which the transformer is mounted on a utility pole. The inferred electrical properties can be used to update representations of electrical assets in computer models of an electric grid.

In general, innovative aspects of the subject matter described in this specification can be embodied in a method including obtaining a plurality of images, each image depicting at least one utility pole of an electric grid; detecting, in each of the plurality of images, keypoints of the at least one utility pole depicted in the image; determining, using the keypoints from at least two images of a particular utility pole, at least one measurement of the particular utility pole; determining, using the measurement of the particular utility pole, an electrical characteristic of an asset supported by the particular utility pole; and providing the electrical characteristic as an output.

These and other embodiments can include the following features, alone or in any combination. In some implementations, determining the measurement of the particular utility pole includes: determining a first spatial location of a first keypoint by performing triangulation using the at least two images; determining a second spatial location of a second keypoint by performing triangulation using the at least two images; and determining a distance between the first spatial location and the second spatial location to obtain the measurement.

In some implementations, performing triangulation includes performing triangulation using metadata associated with the at least two images, the metadata associated with an image indicating at least one of: an orientation of a camera at a time the image was captured; or a geographic location of the camera at the time the image was captured.

In some implementations, the measurement of the particular utility pole includes one of: a width of a crossarm of the particular utility pole; a mount height of a transformer supported by the particular utility pole; or a height of the particular utility pole.

In some implementations, the method includes determining, from each of the at least two images of the particular utility pole, an estimated geographic location of the particular utility pole; and processing the estimated geographic locations of the particular utility pole with a clustering algorithm to determine a geographic location of the particular utility pole.

In some implementations, the method includes identifying, from the keypoints from the at least two images, a set of keypoints associated with the particular utility pole based on the geographic location of the particular utility pole.

In some implementations, determining the measurement of the particular utility pole includes: determining a first spatial location of a first keypoint of the set of keypoints; determining a second spatial location of a second keypoint of the set of keypoints; and determining a distance between the first spatial location and the second spatial location to obtain the measurement.

In some implementations, detecting the keypoints of the at least one utility pole includes processing the plurality of images using a model that is configured to identify keypoints of utility poles in images.

In some implementations, the model includes a convolutional neural network model.

In some implementations, determining the electrical characteristic of the asset supported by the particular utility pole includes selecting the electrical characteristic from a database of characteristics of electric grid assets based on the measurement of the particular utility pole.

In some implementations, determining the electrical characteristic of the asset supported by the particular utility pole includes processing the measurement of the particular utility pole using a model that is configured to identify characteristics of electric grid assets using utility poles measurements.

In some implementations, the plurality of images includes at least one of visible light imagery, infrared imagery, hyperspectral imagery, multispectral imagery, RADAR imagery, or LIDAR imagery.

In some implementations, the asset includes one of a capacitor, a transformer, a switch, or a power line.

In some implementations, the method includes updating a virtual representation of the asset in a computer model of the electric grid to include the electrical characteristic.

In some implementations, the virtual representation of the asset includes at least one of a geographic location, an elevation, a classification, a position, or a status of the asset.

In some implementations, the plurality of images includes at least one of aerial images or street level images.

In some implementations, the at least two images include images of the particular utility pole captured from multiple different camera perspectives.

In some implementations, the method includes generating a virtual representation of the asset for use in a computer model of the electric grid.

Particular implementations of the subject matter described in this specification can be implemented so as to realize one or more of the following advantages. Implementations may improve computer vision systems. For example, implementations enhance operations of computer vision systems so that such systems can be employed to detect electrical characteristics of objects from digital images. Implementations improve the ability to infer electrical characteristics of electric grid assets, in addition to asset location and detection.

Implementations improve coverage of electric grids for modeling purposes. Ground level or street view based methodologies are limited by image coverage. For example, street view image cameras might not have access to backyards, small alleys, and other locations. Aerial oblique imagery covers a wider area including places that may be inaccessible to street view cars or people.

Implementations provide improved efficiency and scalability. Oblique imagery can be collected by aircraft, which can update information for a wide area of an electric grid in a short amount of time, and in one flight or a few flights. This also permits updating imagery, and the associated inferred electric characteristics, more frequently compared to using street level imagery. Thus, changes to the electric grid can be reflected quickly in modeling systems.

Other implementations of the above aspects include corresponding systems, apparatus, and computer programs configured to perform the actions of the methods, encoded on computer storage devices. The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes computer-implemented methods, software, and systems for modeling electric grid assets using photogrammetry. Implementations of the present disclosure will be discussed with reference to an example context, however, it should be appreciated that the implementations disclosed may be applicable more generally. The example context includes detection of electrical characteristics from digital images. In particular, the process is disclosed within the context of identifying electrical characteristics of a transformer mounted to a utility pole. The utility pole is a component of an electrical distribution system that distributes three phase alternating current (AC) power to loads. Implementations of the present disclosure can be realized in other appropriate contexts, for example, identifying characteristics of components of a water distribution system or gas distribution system using photogrammetry. In an example context, a water or gas distribution system may include components such as piping, tanks, pumps, valves, compressors, transmission lines. Sizes and locations of the components may be associated with characteristics such as pressures, capacities, volumes, and flow rates. The disclosed techniques can be implemented to identify keypoints of the components and to apply photogrammetry techniques in order to determine characteristics of the components of the water or gas distribution system.

Figure 1:
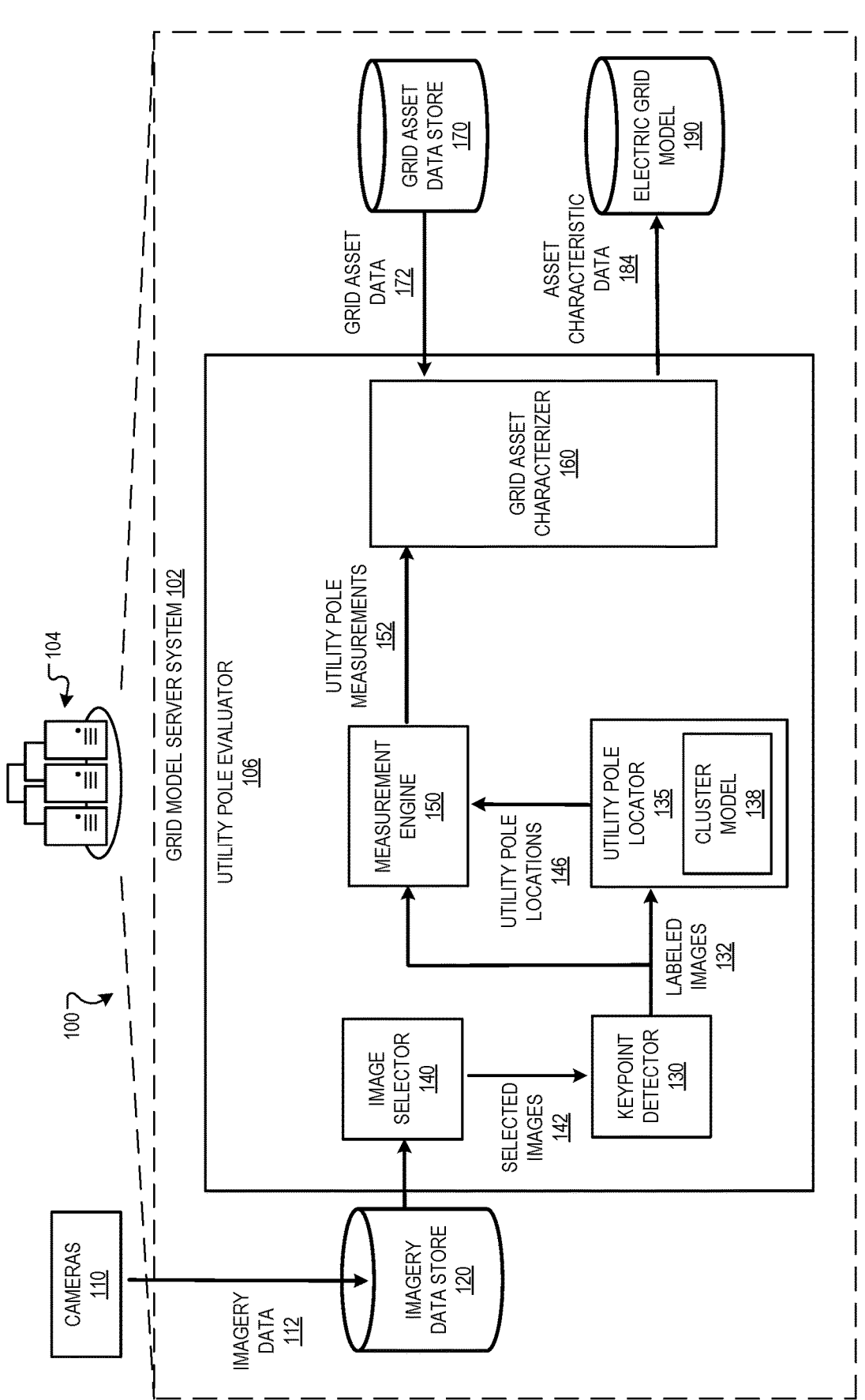
FIG. 1 is a diagram of an example system for modeling electric grid assets using photogrammetry in accordance with the present disclosure.

FIG. 1 is a diagram of an example system 100 for modeling electric grid assets using photogrammetry. The system 100 includes a grid model server system 102. The server system 102 may be hosted within a data center 104, which can be a distributed computing system having hundreds or thousands of computers in one or more locations.

The server system 102 includes an imagery data store 120, a utility pole evaluator 106, a grid asset data store 170, and an electric grid model 190. The utility pole evaluator 106 includes a machine learning model for keypoint detection, e.g., keypoint detector 130. The utility pole evaluator 106 includes an image selector 140, a utility pole locator, a measurement engine 150, and a grid asset characterizer 160. Components and modules of the server system 102 can be provided as one or more computer executable software modules or hardware modules. That is, some or all of the functions of the utility pole evaluator 106 can be provided as a block of computer code, which upon execution by a processor, causes the processor to perform functions described below. Some or all of the functions of the server system 102 can be implemented in electronic circuitry, e.g., by individual computer systems (e.g., servers), processors, microcontrollers, a field programmable gate array (FPGA), or an application specific integrated circuit (ASIC).

The server system 102 obtains imagery data 112 from cameras 110. In some examples, the cameras 110 are mounted on aerial vehicles. Multiple cameras can be mounted to an aerial vehicle, capturing images at various angles as the aerial vehicle passes over a geographic region. The imagery data 112 can include images of varying resolutions. The imagery data 112 can include large numbers of images, e.g., hundreds of images, of the same location. The imagery data 112 can include images captured during multiple flights performed by the same aerial vehicle or different aerial vehicles.

The cameras 110 can include visible light cameras, infrared sensors, RADAR sensors, and LIDAR sensors. The imagery data 112 can include visible light data, e.g., red-green-blue (RGB) data, hyperspectral data, multispectral data, infrared data, RADAR data, and LIDAR data collected by the cameras.

The imagery data 112 represents features of a geographic region. The geographic region can include, for example, an area of hundreds of square meters, several kilometers, hundreds of kilometers, or thousands of kilometers. The geographic region can correspond to a location of an electrical distribution feeder or multiple feeders. In some cases, the geographic region can correspond to a location of a bulk power system within and throughout, e.g., a state, county, province, or country. The server system 102 can store the imagery data 112 in the imagery data store 120.

The imagery data 112 can include metadata associated with each image. The metadata for an image can include, for example, data indicating a location of the camera that captured the image, an orientation of the camera that captured the image, a time that the image was captured, and/or a location of the utility pole in the image. The location of the camera and of the utility pole can be stored, for example, as GPS coordinate locations, e.g., latitudinal and longitudinal coordinate locations. The metadata can be captured by the cameras 110 and, by a computing system of the vehicle to which the cameras are mounted, or both.

The orientation of a camera 110 that captured imagery data 112 can include, for example, a yaw, pitch, and roll of the camera. The yaw can represent rotation around a vertical axis with respect to a ground plane. For example, a yaw of zero can represent a camera pointing north, and a yaw of one hundred eighty can represent a camera pointing south. The pitch can represent rotation around a horizontal axis with respect to the ground plane. For example, a pitch of zero can represent a camera pointing downward toward the ground, and a pitch of one hundred can represent a camera pointing upwards toward the sky. The roll can represent rotation around a horizontal axis that is perpendicular to the pitch axis. In some examples, the orientation of the camera includes an elevation of the camera relative to the ground.

In some examples, a camera 110 is mounted on a vehicle, and the orientation of the camera can be determined based on a direction of travel of the vehicle at the time when the image was captured. For example, the camera may have a fixed position and orientation relative to the vehicle, e.g., a yaw of ninety degrees relative to the direction of motion of the vehicle. Thus, based on the direction of travel of the vehicle, the yaw of the camera can be computed.

The imagery data 112 is stored in the imagery data store 120. The image selector 140 selects images from the imagery data store 120 for use in evaluating electric grid asset characteristics. The image selector 140 outputs selected images 142 to the keypoint detector 130 of the utility pole evaluator 106.

The image selector 140 selects a set of two or more images (e.g., selected images 142) to be used to determine electrical characteristics of one or more assets on a utility pole. For example, the image selector 140 can select, from the imagery data store 120, multiple images of the same location taken from different perspectives. For example, metadata associated with each labeled image 132 can indicate an angle or orientation of a field of view (FOV) axis of the camera that captured the image. The image selector 140 can select images for which the orientations of the FOV axes differ by at least a threshold amount.

In some implementations, the image selector 140 can select the images using selection criteria. The selection criteria can specify that the images be located within a specified geographic range to each other. For example, the selection criteria can include that the selected images 142 are captured from locations within a threshold geographic range of a quarter mile from each other. In some examples, the selection criteria can specify that the selected images 142 depict at least one utility pole of an electric grid. In some examples, the selection criteria can include that the selected images 142 were captured from the same flight or from the same aerial vehicle. In some examples, the selection criteria can include that the selected images 142 include, in their field of view, a same geographic point.

Figure 2A:
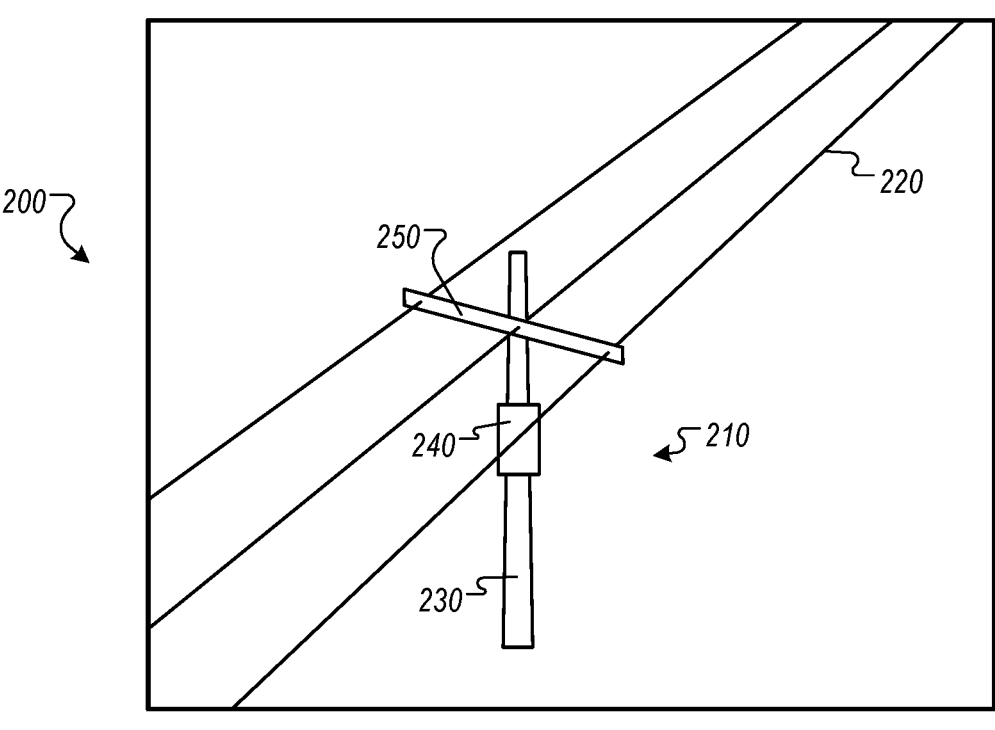
FIG. 2A illustrates an example image of a utility pole in accordance with the present disclosure.
Figure 2B:
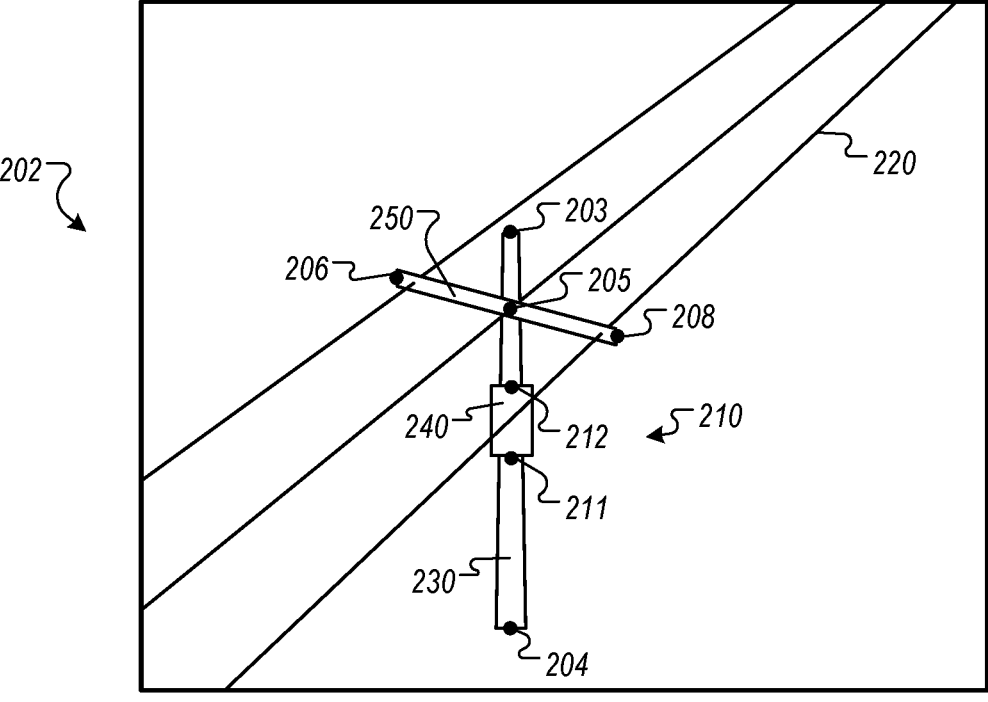
FIG. 2B illustrates the example image of FIG. 2A labeled with keypoints in accordance with the present disclosure.

FIG. 2A illustrates an example image of a utility pole in accordance with the present disclosure. FIG. 2B illustrates the example image of FIG. 2A labeled with keypoints in accordance with the present disclosure. The keypoints are detected by a keypoint detector 130, which can be a machine learning model that is used to detect and label utility poles and attached assets within the selected images 142.

Referring to FIG. 2A, example image 200 shows a utility pole 210. The utility pole 210 supports an upright pole 230, a crossarm 250, a transformer 240, and grid wires 220. Images of utility poles can include depictions of other electrical grid assets. For example, in addition to transformers and wires, electric grid assets can include bushings, fuses, wires, stirrups, capacitors and switches.

In some examples, detecting the keypoints of a utility pole includes processing the images using a model, e.g., the keypoint detector 130, that is trained to identify keypoints of utility poles in images. In some examples, the model is a machine learning model such as an autoencoder model or a convolutional neural network model. Keypoint annotation is a method of annotating an object by a series or collection of points. Keypoints can be used to form a point map that defines the pose of an object. In the example system 100, the keypoint detector 130 detects and labels keypoints of utility poles detected in images from the imagery data store 120 to generate labeled images 132.

FIG. 2B shows an example labeled image 202. The labeled image 202 is the image 200 with keypoints labeled. A keypoint is a point in an image that represents a feature of an object depicted in the image. In the example of a utility pole, each keypoint corresponds to a visible feature of the utility pole. The keypoints can correspond to features such as a bottom of the utility pole, a top of the utility pole, an intersection of the utility pole and a crossarm, the bottom of a mounted transformer, and end points of the crossarm. For example, in FIG. 2B, the utility pole 210 is labeled with keypoints. Keypoint 204 corresponds to the bottom of the upright pole 230. Keypoint 203 corresponds to the top of the upright pole 230. Keypoints 206, 208 correspond to end points of the crossarm 250. Keypoint 205 corresponds to an intersection between the upright pole 230 and the crossarm 250. Keypoint 211 corresponds to the bottom of the transformer 240. Keypoint 212 corresponds to the top of the transformer 240. Each keypoint is associated with a pixel, or group of pixels, in the image where the keypoint is located. Each keypoint can be associated with at least one annotation. For example, the keypoint 204 may be associated with an annotation of "bottom of pole."

Referring to FIG. 1, the keypoint detector 130 outputs the labeled images 132 to the utility pole locator 135. The labeled images 132 are the selected images 142 with keypoint labels applied by the keypoint detector 130.

The utility pole locator 135 uses the labeled images 132 and intrinsic and extrinsic parameters of the camera 110 to estimate the locations of the bases of utility poles relative to the earth. For example, a keypoint keypoint corresponding to the base of a utility pole can be mapped to a position on the surface of the earth, based on the metadata from the image. The position on the surface of the earth can be an x-y coordinate location, which can be mapped to a latitude and longitude. The utility pole locator 135 can thus determine an initial estimate of latitude and longitude of an individual utility pole. Because the labeled images 132 include images of the same location captured from multiple views, the utility pole locator 135 detects multiple detections, or observations, of the same utility pole at a particular location. The multiple views can be from multiple images captured at different times and/or from different perspectives.

The utility pole locator 135 uses a spatial clustering algorithm, e.g., cluster model 138, to remove duplicate observations. The cluster model 138 can receive, as input, multiple initial estimates of a location of a utility pole, as determined from each of multiple respective views. The cluster model 138 outputs an updated estimate of the location of the utility pole. The updated estimate of the location of the utility pole that has a higher confidence value than the initial estimate of the utility pole location.

Spatial clustering is a process of associating different views of the same object together. The spatial clustering can be performed using any appropriate methodology, such as K-means, K-medoids, hierarchical, spectral, or any combination of these.

The utility pole locator 135 thus identifies and locates individual utility poles. The utility pole locator 135 outputs utility pole locations 146 to the measurement engine 150.

Figure 3A:
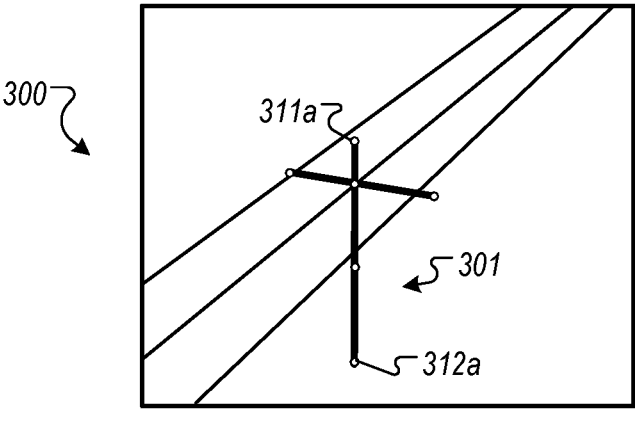
FIGS. 3A, 3B, and 3C illustrate example images of utility poles in accordance with the present disclosure.
Figure 3B:
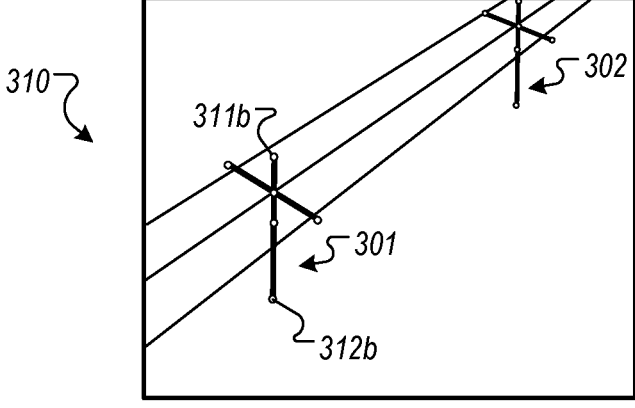
Figure 3C:
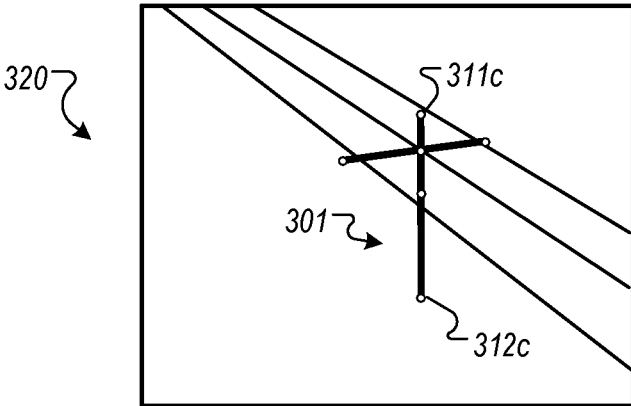

FIGS. 3A, 3B, and 3C illustrate example images 300, 310, 320 of utility poles that represent a set of labeled images 132 depicting the same utility pole. Images 300, 310, 320 each depict the same utility pole 301, captured from different camera perspectives. Referring to FIG. 3B, image 310 depicts a second utility pole 302 in addition to the utility pole 301. In some examples, image segmentation can be used to classify the image 310 into different parts corresponding to the utility pole 301 and to the second utility pole 302.

In some examples, a clustering algorithm, such as a k-means clustering algorithm, can be used to distinguish between two utility poles in one image using spatial density-based clustering. A degree of spatial density can be evaluated based on the number of keypoints in small circled regions of a given radius. If the number of keypoints within a circle is above a given threshold, the keypoints in the circle meet the density threshold and a cluster is created. This is performed recursively until no expanded circle meets the density threshold. Each keypoint in the circle fulfilling the density threshold becomes a center for a new circle. the remaining keypoints become endpoints for creating circles. The keypoints within the recursive circles construct a cluster. Thus, the keypoints around an object form a large cluster. In the image 310, two large clusters may be identified, corresponding to utility pole 301 and utility pole 302. In this way, the density of keypoints in the regions of the images can be used to determine that the image 310 depicts the utility pole 301 and the utility pole 302.

The utility pole locations 146 are provided to the measurement engine 150. The measurement engine 150 determines utility pole measurements 152 from the utility pole locations 146 and the labeled images 132. For example, the measurement engine 150 can identify a set of keypoints in the labeled images 132 that are located at or near a utility pole location 146 of a particular utility pole, and determine that the set of keypoints are associated with the particular utility pole. In some examples, the measurement engine 150 can assign the set of keypoints to the particular utility pole based on the locations of the keypoints of the set of keypoints and based on the location of the particular utility pole. For example, the measurement engine 150 can assign the set of keypoints to the particular utility pole based on determining that the keypoints of the set of keypoints are within a threshold distance to the location of the utility pole. The measurement engine 150 can then perform measurements of the particular utility pole using the locations of the individual keypoints of the set of keypoints.

In some examples, the measurement engine 150 determines the utility pole measurements 152 using photogrammetry. Photogrammetry is a non-contacting measurement technique to determine dynamic characteristics and mode shapes of structures. Photogrammetry involves estimating the three-dimensional coordinates of points on an object employing measurements made in two or more photographic images taken from different positions. Common points are identified on each image. Photogrammetry can be performed using triangulation. For example, by taking photographs from at least two different locations and measuring the same object in each picture, a "line of sight" can be constructed from the location of each camera to points on the object. These lines of sight (or rays) are mathematically intersected to produce the three-dimensional coordinates of the points of interest. The three-dimensional points represent a three-dimensional spatial location with respect to the center of the earth.

When the camera location and aiming direction are known, the lines can be mathematically intersected to produce the XYZ coordinates of each targeted point. Thus, the intersection of the rays can be used to determine the three-dimensional location of the point.

The imagery data 112, and therefore the labeled images 132, can include metadata. The metadata can include intrinsic properties of the camera that captured an image. The metadata associated with an image can indicate a time at which the image was captured. The metadata can include an angle or orientation of an FOV axis of the camera that captured the image, at the time the image was captured. The metadata can include a geographic location of the camera at the time the image was captured. The geographic location can include a three-dimensional coordinate location of the camera. The three-dimensional coordinate location can specify, for example, a latitude, longitude, and altitude of the camera. In some examples, the metadata can include an Image size, a camera pose or angle, camera intrinsics, a timestamp, or any combination of these.

The measurement engine 150 determines, using labeled keypoints of the labeled images 132 and the utility pole locations 146, at least one measurement of the utility pole. For example, referring to FIGS. 3A to 3C, the measurement engine 150 can determine a height of the utility pole 301, a width of the crossarm 250, a mount height of the transformer 240, or any of these. The measurement engine 150 determines the measurements using the spatial locations of the keypoints of the utility pole 301.

To determine the measurement of a utility pole, the measurement engine 150 determines a first spatial location of a first keypoint by performing triangulation of the same keypoint between at least two labeled images 132. For example, the measurement engine 150 can determine a first spatial location of keypoint 311, representing the top of the utility pole 301, by performing triangulation between keypoints 311a, 311b, 311c of the images 300, 310, 320, respectively. The measurement engine 150 determines a second spatial location of a second keypoint by performing triangulation between the at least two images. For example, the measurement engine 150 can determine a second spatial location of keypoint 312, representing the bottom of the utility pole 301, by performing triangulation between keypoints 312a, 312b, 312c of the images 300, 310, 320, respectively.

Spatial locations of keypoints, including the first spatial location and the second spatial location, can be defined by a three-dimensional coordinate location of the respective keypoint. For example, the spatial locations can each be defined by a latitudinal coordinate, a longitudinal coordinate, and an altitudinal coordinate. The altitudinal coordinate can indicate a height of the keypoint above sea level, above ground level, or above the center of the earth.

In some examples, the spatial locations can be defined with reference to a geodetic coordinate system. In a geodetic coordinate system, spatial locations are measured by a horizontal datum and a vertical datum. The horizontal measures a location across the surface of the earth, such as by latitude and longitude. The vertical datum measures an elevation relative to an elevational reference such as mean sea level.

In some examples, the spatial locations can be defined with reference to a geocentric coordinate system. In a geocentric coordinate system, spatial locations are defined by X, Y, and Z coordinates with reference to Earth's center of mass.

The measurement engine 150 determines a distance between the first spatial location and the second spatial location to obtain the measurement. For example, the measurement engine 150 can determine a distance between the first spatial location of keypoint 311 and the second spatial location of keypoint 312. The keypoint 311 is annotated as the top of the pole 301, and the keypoint 312 is annotated as the bottom of the pole 301. Thus, the measurement engine 150 can determine the height of the pole based on the distance between the keypoint 311 and the keypoint 312. The measurement engine 150 can obtain measurements such as a width of a crossarm of a utility pole, a mount height of the crossarm of the utility pole crossarm, a mount height of a transformer supported by the utility pole, a width of the utility pole, etc.

The measurement engine 150 outputs utility pole measurements 152 for a particular utility pole to the grid asset characterizer 160. The grid asset characterizer 160 determines, using the utility pole measurements 152, an electrical characteristic of an asset supported by the particular utility pole. The grid asset characterizer 160 provides the electrical characteristic of the asset, or asset characteristic data 184, as output.

In some examples, the grid asset characterizer 160 determines the asset characteristic data 184 by comparing the utility pole measurements 152 to grid asset data 172 stored in a grid asset data store 170. The grid asset data store 170 is a database of characteristics of electric grid assets. The grid assets can include equipment such as transformers, capacitors, power lines, switches, crossarms, risers, insulators, reclosers, switch handles, switch control rods, voltage regulators, feeders, and other assets. The grid asset data store 170 can store information on various models of electric grid assets, including voltage ratings, capacity ratings, sizes, mount heights, clearance requirements, spacing requirements.

The grid asset characterizer 160 can determine an electrical characteristic from the grid asset data store 170 based on the utility pole measurements 152. For example, the utility pole measurements 152 can include an estimated height of the utility pole 301 of fifty-eight feet tall. The grid asset characterizer 160 can compare the estimated height of fifty-eight feet to grid asset data 172 from the grid asset data store 170. The grid asset characterizer 160 can select, from the grid asset data 172, an electrical characteristic of 69 kV for power lines supported by the utility pole, based on the estimated height. In this way, the grid asset characterizer 160 determines grid asset characteristics from the utility pole measurements 152.

In some examples, the grid asset characterizer 160 can determine a voltage level of a transformer supported by the utility pole based on utility pole measurements 152 including a size of the transformer, a mount height of the transformer, or both.

In some examples, the grid asset characterizer can determine a voltage level of a power line supported by the utility pole based on a mount height of a crossarm that supports the power line, a width of the crossarm that supports the power line, spacing between power lines, the spacing between crossarms, or any combination of these.

In some examples, the grid asset characterizer 160 can determine a phase impedance of a power line supported by the utility pole based on utility pole measurements 152 including a spacing between power lines, a number of power lines, a width of a crossarm that supports the power line, or both.

The asset characteristic data 184 can include characteristics of assets such as capacitor banks, reclosers, risers, and switches. The characteristics can include the state of an asset, such as whether a switch is in an on-state or an off-state.

In some examples, in addition to or instead of comparing the utility pole measurements 152 with grid asset data 172, the grid asset characterizer 160 can process the utility pole measurements 152 with a model that is configured to determine characteristics of electric grid assets from utility pole measurements. The model can be a machine learning model that is trained to generate asset characteristic data 184. The grid asset characterizer 160 can include, for example, a convolutional neural network model that is trained to identify components of electric grids. The grid asset characterizer 160 can be trained, for example, using training data that includes measurements of utility poles as related to various electrical characteristics.

The grid asset detector 180 of the utility pole evaluator 106 provides asset characteristic data 184 as output. The asset characteristic data 184 can include, for example, a geographic location of a grid asset, an identification of the utility pole to which the grid asset is mounted, and/or electrical characteristics determined by the grid asset characterizer 160. In some examples, the asset characteristic data 184 includes a classification of the grid asset, an on/off status of the grid asset, a power rating of the grid asset, a height or elevation of the grid asset.

The system can add the asset characteristic data 184 to an existing model of the electric grid, e.g., electric grid model 190. The electric grid model 190 is a computer model of the electric grid. In some cases, the system can generate a model of the electric grid based on generated representations of electric grid assets, including asset characteristic data 184 provided by the utility pole evaluator 106.

The model of the electric grid can include a high resolution model of one or more electrical distribution feeders. The electric grid model 190 can include, for example, data models of substation transformers, medium voltage distribution lines, distribution switches and reclosers, fixed and switched capacitors, voltage regulation schemes, e.g., tapped magnetics or switched capacitors, network transformers, load transformers, inverters, generators, and various loads. The electric grid model 190 can also include transformer locations and capacities, feeder locations and capacities, and load locations.

In some examples, the utility pole evaluator 106 generates a virtual representation of the asset for use in the electric grid model 190. For example, the electric grid model 190 may not include the transformer 240. The utility pole evaluator 106 can output asset characteristic data 184 for the transformer 240, and the electric grid model 190 can use the asset characteristic data 184 to generate a virtual representation of the transformer 240 for use in the electric grid model 190. The virtual representation of the asset can include a geographic location, an elevation, a classification, a position, a status, an electric characteristic, or any combination of these.

In some examples, the utility pole evaluator 106 updates a virtual representation of the asset in the electric grid model 190 to include the electrical characteristic. For example, the electric grid model 190 may include a virtual representation of the transformer 240. The grid asset characterizer 160 may determine that the transformer 240 has a kilovolt-ampere (kVA) rating of 25 kVA. The utility pole evaluator 106 can output asset characteristic data 184 indicating the 25 kVA rating of the transformer 240. The virtual representation of the transformer 240 in the electric grid model 190 can be updated to include the 25 kVA rating of the transformer 240. In this way, the asset characteristic data 184 can be used to update, correct, or fill in gaps of data representing assets of an electric grid.

Adding or updating characteristics of a grid asset to the electric grid model 190 can improve accuracy of the electric grid model 190. Adding or updating the representation of the grid asset to the electric grid model 190 can improve accuracy of monitoring and/or simulating electrical power grid operations using the electric grid model 190.

Figure 4:
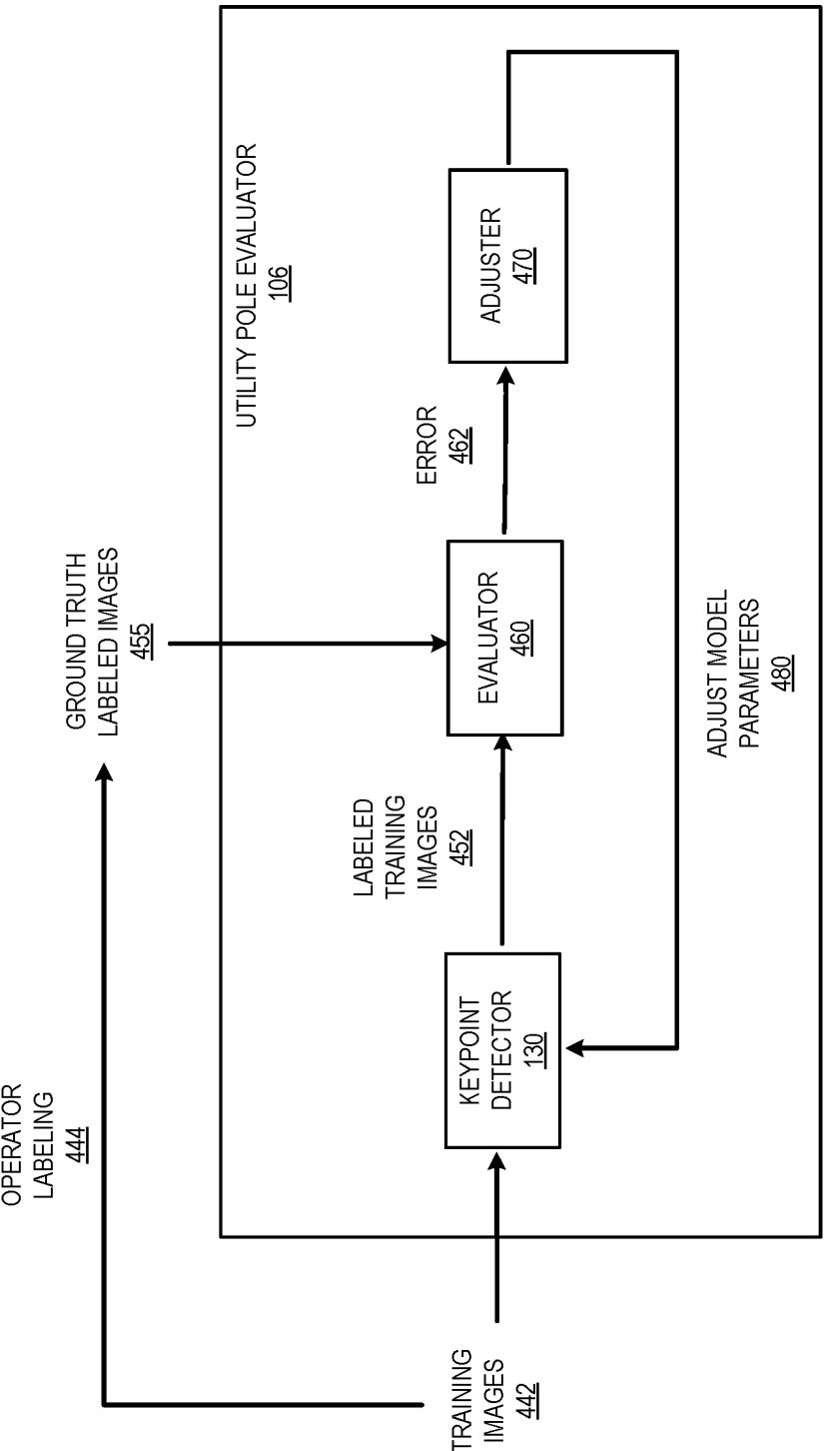
FIG. 4 is a diagram of an example system for training a keypoint detector in accordance with the present disclosure.

FIG. 4 is a diagram of an example system 400 for training the keypoint detector 130 of the power grid modeling system. The system 400 includes the utility pole evaluator 106. The utility pole evaluator 106 includes the keypoint detector 130, an evaluator 460, and an adjuster 470. The keypoint detector 130, the evaluator 460, and the adjuster 470 can each be provided as one or more computer executable software modules or hardware modules. Some or all of the functions of the keypoint detector 130, the evaluator 460, and the adjuster 470 can be implemented in electronic circuitry, e.g., by individual computer systems (e.g., servers), processors, microcontrollers, an FPGA, or an ASIC.

The ground truth labeled images 455 are labeled by human operators 444. The operators label visible features of the utility poles in the training images 442 to generate the ground truth labeled images 455. For example, the operators can label the top of the utility pole, bottom of the utility pole, bottom of a mounted transformer, intersection of crossarms with the utility pole, and end points of crossarms mounted to the utility pole. In some examples, the ground truth labeled images include, for each utility pole, at least two images depicting the utility pole.

The keypoint detector 130 can be a machine learning model such as an autoencoder model. The system 400 is used to train the keypoint detector 130 by a supervised training process using training images 442 and ground truth labeled images 455. The training images 442 include images of utility poles.

The training images 442 are processed with the keypoint detector 130 to obtain a corresponding output of the keypoint detector 130. For example, the keypoint detector 130 can receive the training images 442 as input and generate corresponding output labeled training images 452. The output labeled training images 452 can include the training images 442 labeled with keypoints. The corresponding output of the keypoint detector 130 includes labeled training images 452, which are output to the evaluator 460.

Parameters of the keypoint detector 130 are adjusted based on the outputs from the keypoint detector 130. The evaluator 460 can compare the labeled training images 452 to the ground truth labeled images 455. The evaluator 460 can determine an error 462 between the labeled training images 452 and the ground truth labeled images 455.

The error 462 between the labeled training images 452 and the ground truth labeled images 455 can include different types of errors. A type of error can occur when an annotation of a keypoint is incorrect. For example, a particular keypoint may be annotated in a ground truth labeled image 455 as "top of pole." The same particular keypoint may be annotated in a labeled training image 452 corresponding to the ground truth labeled image as "bottom of transformer." The evaluator 460 can determine an error based on the annotation of the particular keypoint in the labeled training image 452 not matching the annotation of the particular keypoint in the ground truth labeled image.

Another type of error can occur when a location of a keypoint is incorrect. For example, a particular keypoint annotated "top of pole" may be located at pixel coordinate (x1, y1) of a ground truth labeled image. The same particular keypoint may be located at pixel coordinate (x2, y2) of a labeled training image corresponding to the ground truth labeled image. The evaluator 460 can determine an error based on the distance between pixel coordinate (x1, y1) and (x2, y2).

Another type of error can occur when a labeled training image 452 is missing a keypoint. For example, a ground truth labeled image 455 may include keypoints representing two ends of a crossarm. A labeled training image 452 corresponding to the ground truth labeled image 455 may include a keypoint representing one end of the crossarm, and may be missing a keypoint representing the second end of the crossarm. The evaluator 460 can determine an error based on the labeled training image 452 missing the keypoint representing the second end of the crossarm.

Another type of error can occur when a labeled training image 452 includes an extra keypoint. For example, a ground truth labeled image 455 might not include a keypoint representing a mount height of a transformer. A labeled training image 452 corresponding to the ground truth labeled image 455 may include an extraneous keypoint representing a mount height of a transformer. The evaluator 460 can determine an error based on the labeled training image 452 including the extra keypoint.

Parameters of the keypoint detector 130 can be adjusted based on comparing the output labeled training images 452 to the ground truth labeled images 455. For example, the adjuster 470 can adjust model parameters 480 based on the error 462. Model parameters can include, for example, configuration variables, neural network weights, support vectors, and coefficients of the model. By adjusting the model parameters based on the error 462, the keypoint detector 130 can be trained to accurately detect and label keypoints of images of utility poles.

Figure 5:
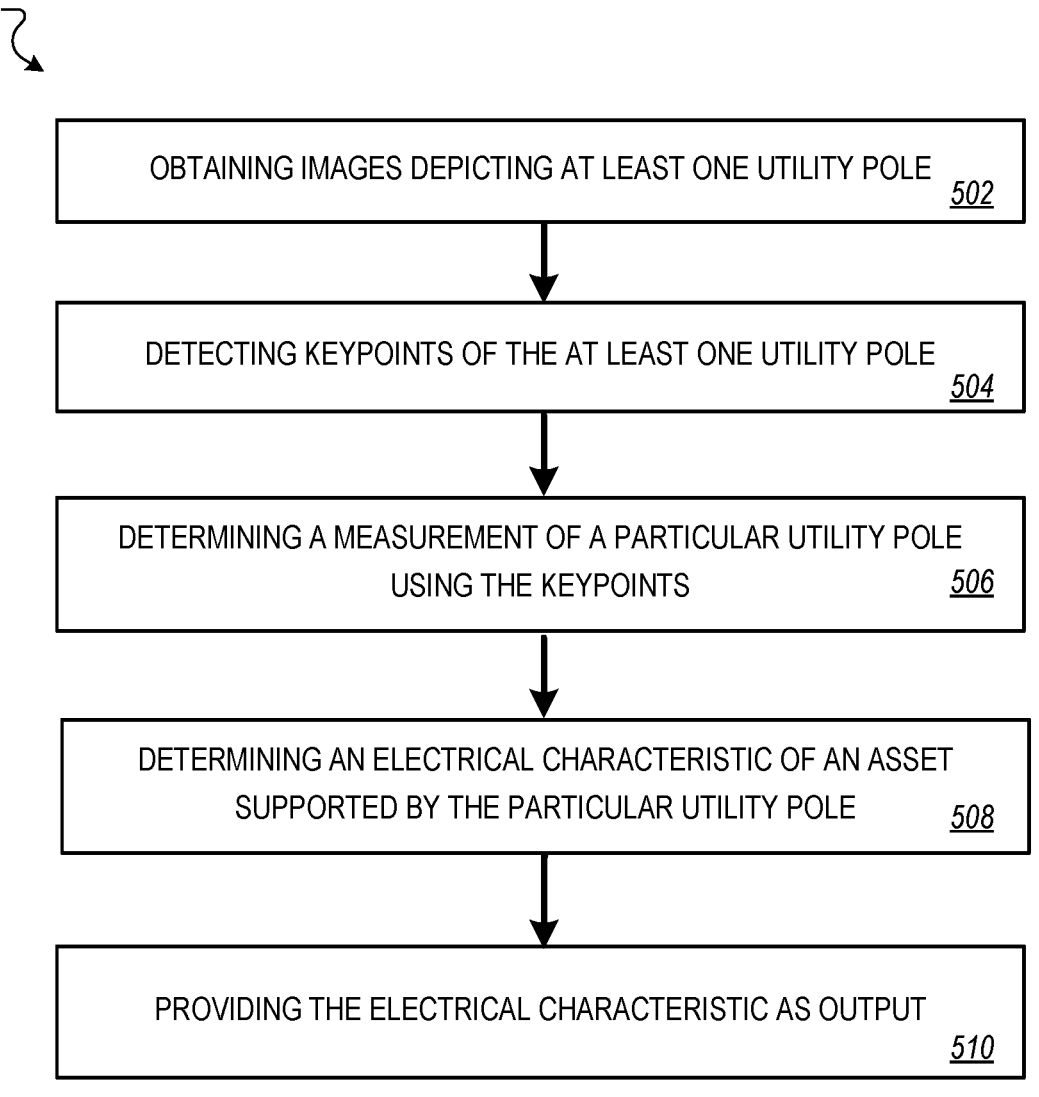
FIG. 5 is a flow diagram of an example process for modeling electric grid assets using photogrammetry in accordance with the present disclosure.

FIG. 5 is a flow diagram of an example process 500 for determining characteristics of electric grid assets using photogrammetry in accordance with the present disclosure. The process can be performed by a computing system including one or more computers, such as the grid model server system 102.

The process 500 includes obtaining images depicting at least one utility pole (502). The computing system can obtain a plurality of images, each image depicting at least one utility pole of an electric grid. The images can include aerial images, street level images, or both. Street level images can be captured by vehicles or people on or near the ground. In some examples, the images include oblique aerial images. An oblique aerial image is an image that is captured at an angle with respect to the ground. For example, an oblique aerial image can be an image that is captured by a camera with a FOV axis that forms an angle with the ground of seventy-five degrees or less (e.g., sixty-five degrees or less, fifty-five degrees or less, forty-five degrees or less, thirty-five degrees or less). The images include images of a particular utility pole captured from multiple different camera perspectives. The images can include visible light imagery, infrared imagery, hyperspectral imagery, multispectral imagery, RADAR imagery, LIDAR imagery, or any combination of these.

The process 500 includes detecting keypoints of the at least one utility pole (504). For example, the computing system can label, in each of the plurality of images, keypoints of the at least one utility pole depicted in the image. In some examples, detecting the keypoints of the utility pole includes processing the plurality of images using a machine learning model, such as the keypoint detector 130, that is configured to identify keypoints of utility poles in images as discussed above. The keypoint detector can be a convolutional neural network model.

The process 500 includes determining a measurement of a particular utility pole using the keypoints (506). For example, the computing system can determine, using the keypoints from at least two images of a particular utility pole, at least one measurement of the particular utility pole. For example, the utility pole locator 135 can determine a location of a utility pole. The measurement engine 150 can determine utility pole measurements 152 for the utility pole using the keypoints located at or near the location of the utility pole. For instance, as discussed above, the measurement engine 150 can use triangulation techniques to determine spatial locations of key points corresponding to the same utility pole. The measurement engine 150 can determine a distance between the spatial locations to perform a physical measurement of the utility pole from the images.

The process 500 includes determining an electrical characteristic of an asset supported by the particular utility pole (508). For example, the computing system can determine, using the measurement of the particular utility pole, an electrical characteristic of an asset supported by the particular utility pole. The asset can be, for example, a capacitor, a transformer, a switch, a power line. The electrical characteristic can include, for example, a voltage, a phase, an impedance, a capacity, an on-off state.

The process 500 includes providing the electrical characteristic as an output (510). In some examples, the electrical characteristic is provided as output to a dataset representing electric grid assets. In some examples, the electrical characteristic is provided as output to a computer model of an electric grid.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of sub-combinations.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

The invention claimed is:

1. A computer-implemented method comprising:
obtaining a plurality of images, each image depicting at least one utility pole of an electric grid;
detecting, in each of the plurality of images, keypoints of the at least one utility pole depicted in the image;

determining, using the keypoints from at least two images of a particular utility pole, at least one measurement of the particular utility pole, including by:

determining a first spatial location of a first keypoint by performing triangulation using the at least two images;

determining a second spatial location of a second keypoint by performing triangulation using the at least two images; and determining a distance between the first spatial location and the second spatial location to obtain the at least one measurement;

determining, using the at least one measurement of the particular utility pole, an electrical characteristic of an asset supported by the particular utility pole; and providing the electrical characteristic as an output.

2. The method of claim 1, wherein performing triangulation comprises performing triangulation using metadata associated with the at least two images, the metadata associated with an image indicating at least one of:

an orientation of a camera at a time the image was captured; or a geographic location of the camera at the time the image was captured.

3. The method of claim 1, wherein the at least one measurement of the particular utility pole comprises one of:

a width of a crossarm of the particular utility pole;

a mount height of a transformer supported by the particular utility pole; or a height of the particular utility pole.

4. The method of claim 1, comprising:

determining, from each of the at least two images of the particular utility pole, an estimated geographic location of the particular utility pole; and processing the estimated geographic locations of the particular utility pole with a clustering algorithm to determine a geographic location of the particular utility pole.

5. The method of claim 4, comprising identifying, from the keypoints from the at least two images, a set of keypoints associated with the particular utility pole based on the geographic location of the particular utility pole.

6. The method of claim 1, wherein detecting the keypoints of the at least one utility pole comprises processing the plurality of images using a model that is configured to identify keypoints of utility poles in images.

7. The method of claim 6, wherein the model comprises a convolutional neural network model.

8. The method of claim 1, wherein determining the electrical characteristic of the asset supported by the particular utility pole comprises selecting the electrical characteristic from a database of characteristics of electric grid assets based on the at least one measurement of the particular utility pole.

9. The method of claim 1, wherein determining the electrical characteristic of the asset supported by the particular utility pole comprises processing the at least one measurement of the particular utility pole using a model that is configured to identify characteristics of electric grid assets using utility poles measurements.

10. The method of claim 1, wherein the plurality of images comprises at least one of visible light imagery, infrared imagery, hyperspectral imagery, multispectral imagery, RADAR imagery, or LIDAR imagery.

11. The method of claim 1, wherein the asset comprises one of a capacitor, a transformer, a switch, or a power line.

12. The method of claim 1, comprising updating a virtual representation of the asset in a computer model of the electric grid to include the electrical characteristic.

13. The method of claim 12, wherein the virtual representation of the asset comprises at least one of a geographic location, an elevation, a classification, a position, or a status of the asset.

14. The method of claim 1, wherein the plurality of images comprises at least one of aerial images or street level images.

15. The method of claim 1, wherein the at least two images comprise images of the particular utility pole captured from multiple different camera perspectives.

16. The method of claim 1, comprising generating a virtual representation of the asset for use in a computer model of the electric grid.

17. A system comprising one or more computers and one or more storage devices on which are stored instructions that are operable, when executed by the one or more computers, to cause the one or more computers to perform operations comprising:

obtaining a plurality of images, each image depicting at least one utility pole of an electric grid;

detecting, in each of the plurality of images, keypoints of the at least one utility pole depicted in the image;

determining, using the keypoints from at least two images of a particular utility pole, at least one measurement of the particular utility pole, including by:

determining a first spatial location of a first keypoint by performing triangulation using the at least two images;

determining a second spatial location of a second keypoint by performing triangulation using the at least two images; and determining a distance between the first spatial location and the second spatial location to obtain the at least one measurement;

determining, using the at least one measurement of the particular utility pole, an electrical characteristic of an asset supported by the particular utility pole; and providing the electrical characteristic as an output.

18. A non-transitory computer storage medium encoded with instructions that, when executed by one or more computers, cause the one or more computers to perform operations comprising:

obtaining a plurality of images, each image depicting at least one utility pole of an electric grid;

detecting, in each of the plurality of images, keypoints of the at least one utility pole depicted in the image;

determining, using the keypoints from at least two images of a particular utility pole, at least one measurement of the particular utility pole, including by:

determining a first spatial location of a first keypoint by performing triangulation using the at least two images;

determining a second spatial location of a second keypoint by performing triangulation using the at least two images; and determining a distance between the first spatial location and the second spatial location to obtain the at least one measurement;

determining, using the at least one measurement of the particular utility pole, an electrical characteristic of an asset supported by the particular utility pole; and providing the electrical characteristic as an output.

19. The system of claim 17, wherein performing triangulation comprises performing triangulation using metadata associated with the at least two images, the metadata associated with an image indicating at least one of:

an orientation of a camera at a time the image was captured; or a geographic location of the camera at the time the image was captured.

20. The non-transitory computer storage medium of claim 18, wherein performing triangulation comprises performing triangulation using metadata associated with the at least two images, the metadata associated with an image indicating at least one of:

an orientation of a camera at a time the image was captured; or a geographic location of the camera at the time the image was captured.

\* \* \* \* \*